United States Patent
Jeng et al.

(10) Patent No.: US 9,774,551 B2
(45) Date of Patent: Sep. 26, 2017

(54) USER DEVICE, CLOUD SERVER AND SHARE LINK IDENTIFICATION METHOD

(71) Applicant: Institute For Information Industry, Taipei (TW)

(72) Inventors: Yu-Lin Jeng, Tainan (TW); Shin Tze Liu, Taipei (TW)

(73) Assignee: Institute For Information Industry, Taipei (TW)

( * ) Notice: Subject to any disclaimer, the term of this patent is extended or adjusted under 35 U.S.C. 154(b) by 157 days.

(21) Appl. No.: 14/562,757

(22) Filed: Dec. 7, 2014

(65) Prior Publication Data
US 2016/0156576 A1   Jun. 2, 2016

(30) Foreign Application Priority Data
Dec. 1, 2014  (CN) .......................... 2014 1 0715905

(51) Int. Cl.
*G06F 15/16* (2006.01)
*H04L 12/58* (2006.01)
*H04L 29/06* (2006.01)
*G06F 17/30* (2006.01)

(52) U.S. Cl.
CPC ........ *H04L 51/08* (2013.01); *G06F 17/30887* (2013.01); *H04L 51/12* (2013.01); *H04L 67/42* (2013.01)

(58) Field of Classification Search
CPC ................................ H04L 51/10; H04L 67/42
USPC ........................................................ 709/229
See application file for complete search history.

(56) References Cited

U.S. PATENT DOCUMENTS

| | | | |
|---|---|---|---|
| 2012/0011167 A1* | 1/2012 | Schmidt | G06F 17/3087 707/802 |
| 2012/0203929 A1 | 8/2012 | Patalsky | |
| 2012/0331108 A1* | 12/2012 | Ferdowsi et al. | H04L 67/06 709/219 |
| 2013/0073389 A1* | 3/2013 | Heath | G06Q 50/01 705/14.54 |
| 2013/0268552 A1* | 10/2013 | Platt et al. | G06F 21/6218 707/769 |

(Continued)

FOREIGN PATENT DOCUMENTS

| | | |
|---|---|---|
| TW | 501027 | 9/2002 |
| TW | 200951737 A | 12/2009 |
| TW | 201040755 A1 | 11/2010 |

OTHER PUBLICATIONS

Office Action to the corresponding Taiwan Patent Application No. 104101880 rendered by Taiwan Intellectual Property Office (TIPO) on Oct. 7, 2015, 15 pages (including English translation).

*Primary Examiner* — Phuoc Nguyen
(74) *Attorney, Agent, or Firm* — Skaar Ulbrich Macari, P.A.

(57) ABSTRACT

A user device, a cloud server and a share link identification method thereof are provided. The cloud server executes a resource management program to generate a share link associated with a shared resource and a piece of identity information of the share link. When a communication message in a communication program running in the user device includes the share link, a plugin program running in the user device crawls the identity information of the share link from the cloud server according to the share link, and presents the identity information in a graphical user interface of the communication program.

20 Claims, 10 Drawing Sheets

(56) References Cited

U.S. PATENT DOCUMENTS

| | | | | |
|---|---|---|---|---|
| 2014/0115054 A1* | 4/2014 | Ibel | ............. | G06F 21/62 |
| | | | | 709/204 |
| 2014/0164913 A1* | 6/2014 | Jaros et al. | ............ | G06F 17/212 |
| | | | | 715/243 |
| 2014/0181198 A1* | 6/2014 | Motes et al. | ............ | H04L 29/06 |
| | | | | 709/204 |
| 2014/0280498 A1* | 9/2014 | Frankel et al. | ........ | H04W 4/206 |
| | | | | 709/203 |
| 2014/0344281 A1* | 11/2014 | Rao et al. | ............... | H04L 67/22 |
| | | | | 707/741 |
| 2016/0098153 A1* | 4/2016 | Gupta et al. | .......... | G06F 3/0481 |
| | | | | 715/765 |

\* cited by examiner

```
http {
  server {
    location {
      proxy_set_header X-SL-FILENAME $sharelink_filename;
      proxy_set_header X-SL-ICON $sharelink_filename;
}}}
```

FIG. 5A

```
http {
  server {
    location {
      proxy_set_header X-SL-PATH $sharelink_folder;

USER DEVICE, CLOUD SERVER AND SHARE LINK IDENTIFICATION METHOD

PRIORITY

This application claims the benefit of priority based on Chinese Patent Application No. 201410715905.7 filed on Dec. 1, 2014, which is hereby incorporated by reference in its entirety.

FIELD

The present invention relates to a user device, a cloud server and a share link identification method thereof. More particularly, the user device of the present invention presents a piece of identity information of a share link in a graphical user interface of a communication program by executing a plugin program.

BACKGROUND

With rapid development of the computer networks, people have now been accustomed to use of electronic devices (e.g., personal computers, tablet computers, mobile phones and etc.) and communicate with each other through communication programs installed therein. In order to allow the people to share their private resources or network resources in a simpler way, nowadays the network cloud servers can generate a share link for the users. When a user transmits a message carrying a share link to other users via a communication program of an electronic device, shared resources can be accessed by the other users via the share link.

However, because link values in the share links are mostly composed of random English letters and numerals (e.g., the link value in a share link "http://cloudresource.com/u10YL02a5ag" is "u10YL02a5ag"), the users cannot learn any information of the shared resources directly from the share link. In this case, apart from directly accessing the shared information corresponding to the share link, the users have no other ways to directly confirm whether the shared resources corresponding to the share link are just those he or she wants to share with the others according to the share link before transmitting the message. Similarly, the users receiving the message cannot directly learn related information of the share link according to the share link so as to determine whether to access the corresponding shared resources via the share link.

Accordingly, an urgent need exists in the art to provide an identification mechanism which allows the user to simply and directly identify the shared resources corresponding to the share link without having to access the shared resources corresponding to the share link.

SUMMARY

An objective of the present invention includes providing an identification mechanism in which a piece of identity information is also generated by a cloud server when generating a share link, and a plugin program is executed by a user device to detect the share link included in a communication message so as to crawl the identity information of the share link from the cloud server and present it. Thereby, by the identification mechanism of certain embodiments of the present invention, the user can simply and directly identify the shared resources corresponding to the share link according to the presented identity information without having to access the shared resources corresponding to the share link.

To achieve the aforesaid objective, the present invention in certain embodiments includes a user device, which comprises a network interface and a processor. The network interface is connected to a cloud server via a network via a network. The processor, which is electrically connected to the network interface, is configured to execute a communication program and a plugin program. The plugin program is configured to detect that a communication message in the communication program includes a share link generated by the cloud server. The share link is associated with a shared resource stored in the cloud server. The plugin program is further configured to crawl a piece of identity information of the share link from the cloud server according to the share link and present the identity information in a graphical user interface of the communication program.

Additionally, the present invention in certain embodiments includes a share link identification method for a user device. The user device comprises a network interface and a processor. The network interface is connected to a cloud server via a network. The share link identification method is executed by the processor and comprises the following steps of: (a) executing a communication program and a plugin program; (b) detecting by the plugin program that a communication message in the communication program includes a share link generated by the cloud server, wherein the share link is associated with a shared resource stored in the cloud server; (c) crawling a piece of identity information of the share link from the cloud server according to the share link by the plugin program; and (d) presenting the identity information in a graphical user interface of the communication program by the plugin program.

Additionally, to achieve the aforesaid objective, the present invention in certain embodiments includes a cloud server, which comprises a storage, a network interface and a processor. The storage stores a shared resource. The network interface is connected to a network. The processor, which is electrically connected to the storage and the network interface, is configured to execute a resource management program to generate a share link associated with the shared resource and a piece of identity information of the share link. When a communication message in a communication program running in a user device includes the share link, a plugin program running in the user device crawls the identity information of the share link from the cloud server according to the share link and presents the identity information in a graphical user interface of the communication program.

Furthermore, the present invention in certain embodiments includes a share link identification method for a cloud server. The cloud server comprises a storage, a network interface and a processor. The storage stores a shared resource. The network interface is connected to a network. The share link identification method is executed by the processor and comprises the following steps of: executing a resource management program; and generating a share link associated with the shared resource and a piece of identity information of the share link by the resource management program. When a communication message in a communication program running in a user device includes the share link, a plugin program running in the user device crawls the identity information of the share link from the cloud server according to the share link and presents the identity information in a graphical user interface of the communication program.

The detailed technology and preferred embodiments implemented for the subject invention are described in the following paragraphs accompanying the appended drawings for people skilled in this field to well appreciate the features of the claimed invention.

DETAILED DESCRIPTION

In the following description, the present invention will be explained with reference to example embodiments thereof. However, these example embodiments are not intended to limit the present invention to any specific examples, embodiments, environment, applications or particular implementations described in these example embodiments. Therefore, description of these example embodiments is only for purpose of illustration rather than to limit the present invention, and the scope of the present invention shall be governed by the claims.

It should be appreciated that, in the following embodiments and the attached drawings, elements unrelated to the present invention are omitted from depiction; and dimensional relationships among individual elements in the attached drawings are illustrated only for ease of understanding, but not to limit the actual scale.

Figure 1:
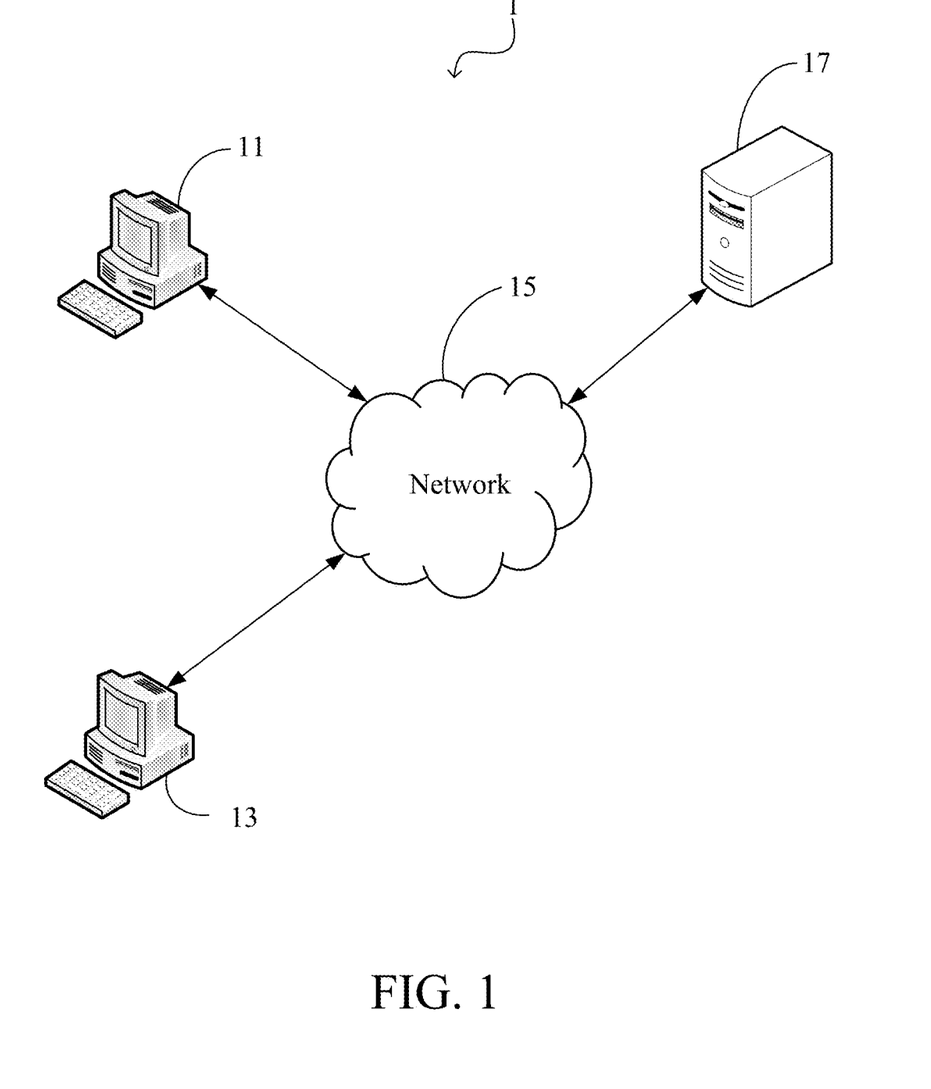
FIG. 1 is a schematic view of a resource sharing system 1 of the present invention.

A first embodiment of the present invention is shown in FIG. 1, which is a schematic view of a resource sharing system 1 of the present invention. The resource sharing system 1 comprises a user device 11, a user device 13, a network 15 and a cloud server 17. The user device 11, the user device 13 and the cloud server 17 are all connected to the network 15. The network 15 may comprise at least one of a local area network (LAN), the Internet, and a telecommunication network, although it is not limited thereto.

The user device 11 and the user device 13 may be a personal computer, a tablet computer, a smart phone or any device with program execution and network connection capabilities. In this embodiment, the user device 11 is a transmitting end, which transmits a message including a share link, while the user device 13 is a receiving end, which receives a message including a share link. The user device 11 is connected to the cloud server 17 via the network 15 so as to obtain the share link which is to share resources, and to transmit the share link out in the form of a message. On the other hand, the user device 13 is connected to the network 15 to receive the message including the share link.

Figure 2:
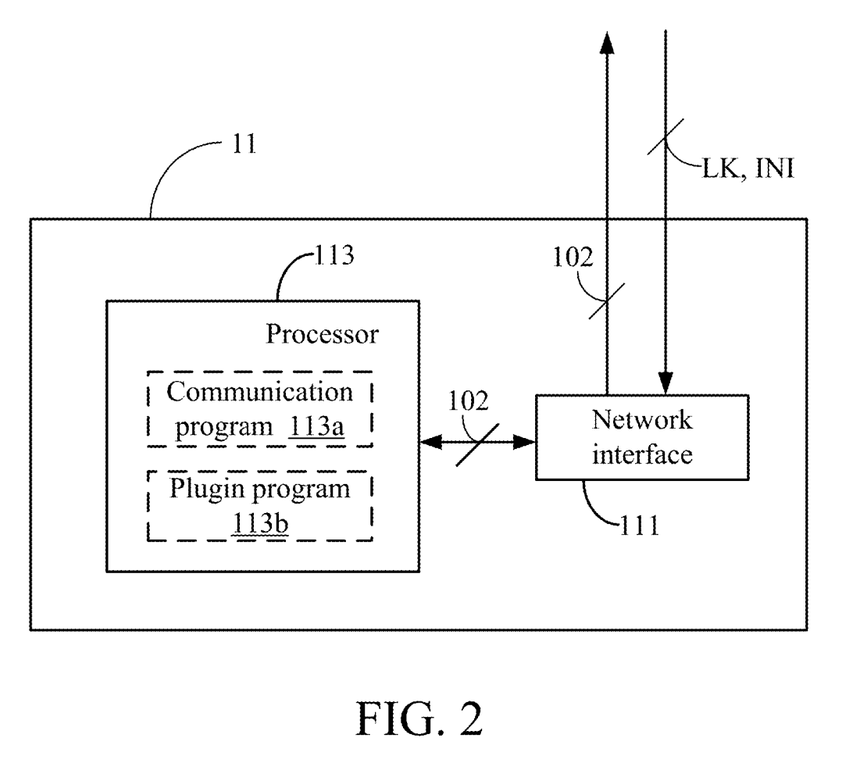
FIG. 2 is a schematic view of a user device 11 according to a first embodiment of the present invention.
Figure 3A:
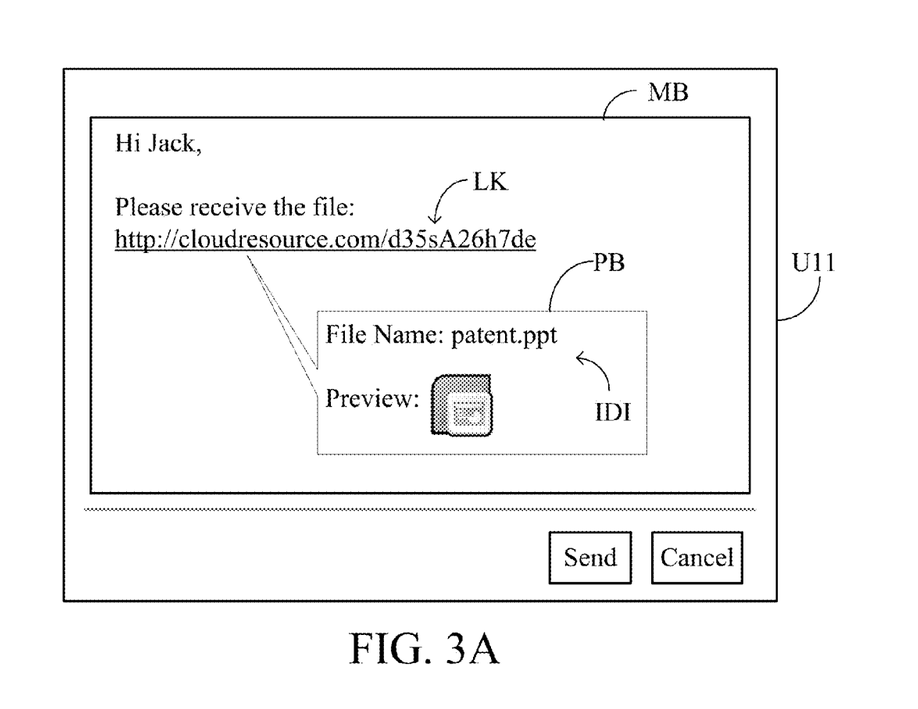
FIGS. 3A-3B and FIGS. 4A-4B depict a graphical user interface U11 of the user device 11 according to the first embodiment of the present invention.

Specifically, referring to FIG. 2, the user device 11 comprises a network interface 111 and a processor 113. The network interface 111 is connected to the network 15 so as to connect to the cloud server 17 via the network 15. The processor 113 is electrically connected to the network interface 111. A user may, through operating the user device 11, enable the processor 113 to execute a communication program 113a and a plugin program 113b and to generate a communication message 102a by the communication program 113a. Then, the communication program 113a presents the communication message 102a in a graphical user interface U11 of the communication program 113a, as shown in FIG. 3A. The communication program 113a may be an E-mail program, an instant messaging program or any program capable of generating, editing, transmitting and receiving a message.

The plugin program 113b is an auxiliary program, and runs in the user device 11 in cooperation with the communication program 113a. The plugin program 113b is configured to detect whether a communication message 102 in the communication program 113a includes a share link LK (e.g., http://cloudresource.com/d35sA26h7de). In this embodiment, the share link LK is generated by the cloud server 17, and is associated with a shared resource SR stored in the cloud server 17. It should be appreciated that, a piece of identity information IDI is also generated by the cloud server 17 when generating the share link LK; and generation of the share link LK and the identity information IDI thereof by the cloud server 17 will be detailed in subsequent embodiments.

Figure 3B:
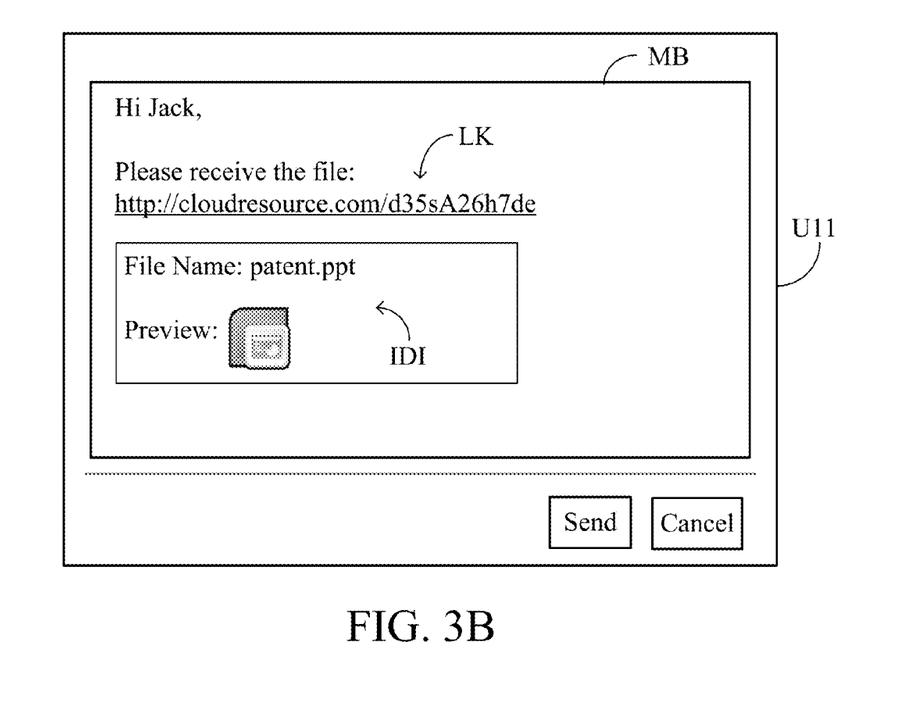

Further speaking, the user device 11 may be operated by the user to connect to the cloud server 17, and then the cloud server 17 may be operated to generate the share link LK and the identity information IDI thereof for the shared resource SR stored therein. Afterwards, as shown in FIG. 3A and FIG. 3B, the user may copy the share link, and paste the share link LK into a message content box MB through the graphical user interface U11 of the communication program 113a so that the share link LK is added into the communication message 102. After the share link LK is added into the communication message 102 and the share link LK is detected by the plugin program 113b, the plugin program 113b crawls the identity information IDI of the share link LK from the cloud server 17 according to the share link LK. Next, the plugin program 113b presents the identity information IDI in the graphical user U11 interface of the communication program 113a.

For example, as shown in FIG. 3A, when detecting that a mouse cursor (i.e., when the user device 11 can be operated by a mouse) or a long touch (i.e., when the user device comprises a touch screen) is located at a position of the share link LK in the graphical user interface U11, the plugin program 113b presents the identity information IDI in a popup display box PB of the graphical user interface U11. Then, when detecting that the mouse cursor or the touch is located not at the position of the share link LK in the graphical user interface U11, the plugin program 113b closes the popup display box PB. Additionally, in another example as shown in FIG. 3B, the plugin program 113b may also embed the identity information IDI into the communication message 102 directly, and present it in a message content box MB of the graphical user interface U11. In other words, the plugin program 113b may add the identity information IDI into the message content box MB in the form of a graph, texts, or some other form. Thereby, even if no identical or similar plugin program is installed in the user device that receives the communication message 102, the identity information IDI of the share link LK can also be obtained from the communication message 102 directly.

Figure 4A:
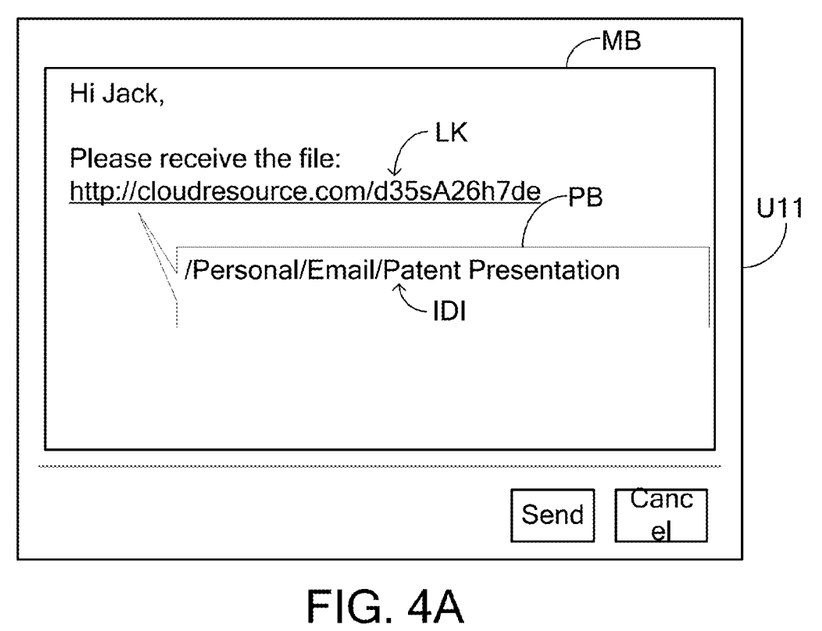
Figure 4B:
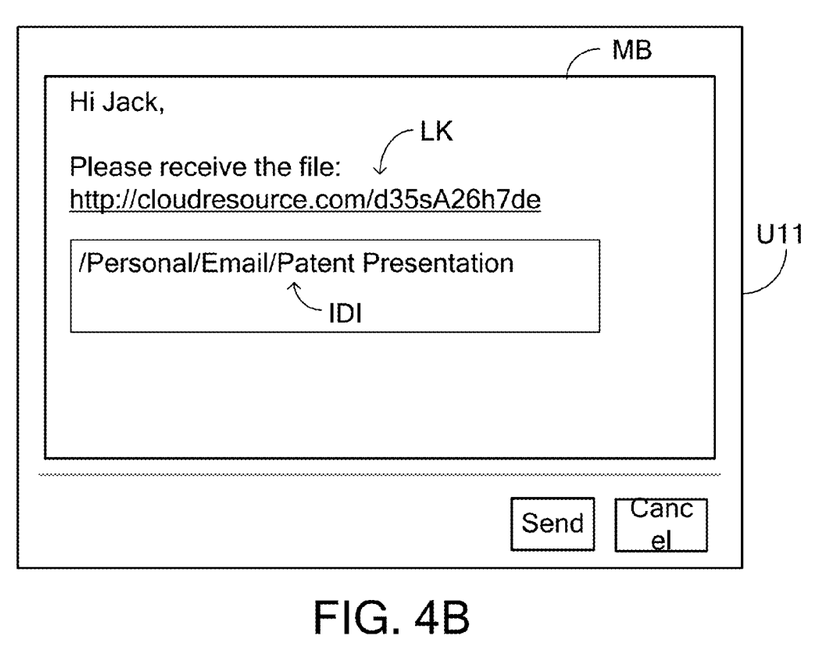
Figure 5A:
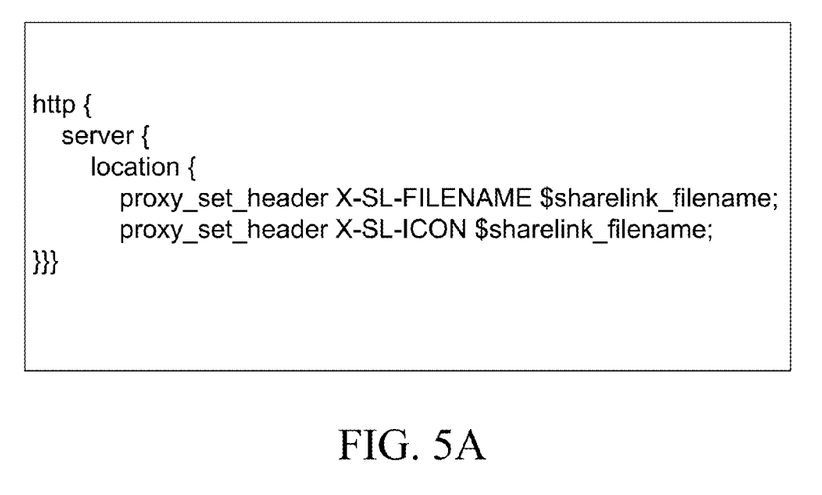
FIGS. 5A-5B depict an example of metadata of the identity information IDI of the present invention.
Figure 5B:
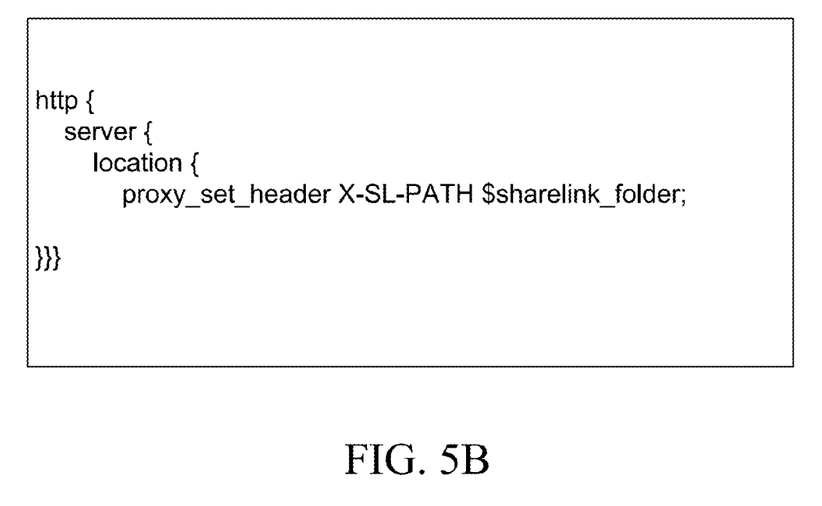

It should be appreciated that, in the example shown in FIG. 3A and FIG. 3B, the shared resource SR is a presentation file, and the identity information IDI includes the file name and a preview image of the presentation file. However, in other embodiments, the shared resource SR may be a folder path, and then the identity information IDI includes the path description, as shown in FIG. 4A and FIG. 4B. In this embodiment, the plugin program 113b generates a query message to the cloud server 17 according to the share link LK. After receiving the query message, the cloud server 17 generates a reply message based on the HyperText Transfer Protocol (HTTP) so as to carry the metadata of the identity information IDI into an HTTP header of the reply message, as shown in FIG. 5A and FIG. 5B. Accordingly, the plugin program 113b can retrieve the identity information IDI of the share link LK from the reply message. However, the type of the reply message generated by the cloud server 17 described above and how to carry the identity information IDI are only described for purpose of illustration, rather than to limit the present invention.

In another embodiment, when the communication message 102 generated by the communication program 113a may additionally include an appended file, the plugin program 113b of the present invention may further upload the additional appended file to the cloud server 17 so that the cloud server 17 generates the share link LK and the identity information IDI according to the uploaded appended file. Additionally, the plugin program 113b adds the share link LK generated by the cloud server 17 into the communication message 102 automatically. Likewise, the identity information IDI may include the file name and a preview image or the path description. However, the information included in the identity information IDI is not intended to limit the present invention.

In other embodiments, the cloud server 17 may encrypt the identity information IDI to provide security protection. In this case, the plugin program 113b is further configured to decrypt the identity information IDI. Because any of the conventional encryption and decryption technologies can be used in the present invention and the encryption and decryption technologies are not intended to limit the present invention, this will not be further described herein. Additionally, in other embodiments, the plugin program 113b may comprises a plugin primary program (not shown) and an information crawling program (not shown). The plugin primary program is configured to detect that the communication message 102 includes the share link LK and to present the identity information IDI in the graphical user interface U13, and the information crawling program is configured to crawl the identity information IDI of the share link LK from the cloud server 17.

Figure 6:
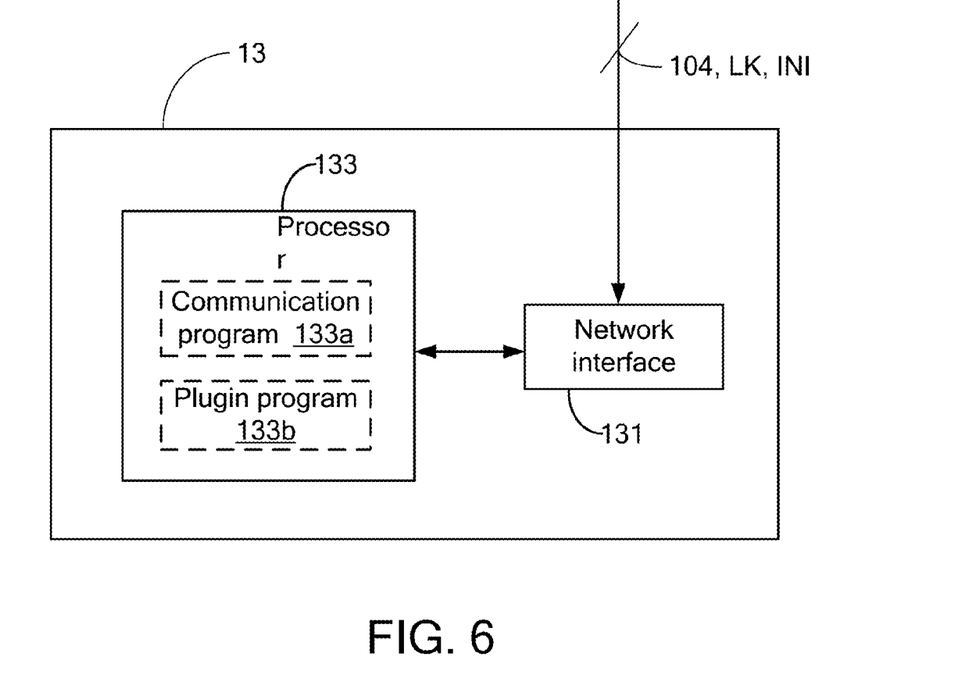
FIG. 6 is a schematic view of a user device 13 according to a second embodiment of the present invention.
Figure 7A:
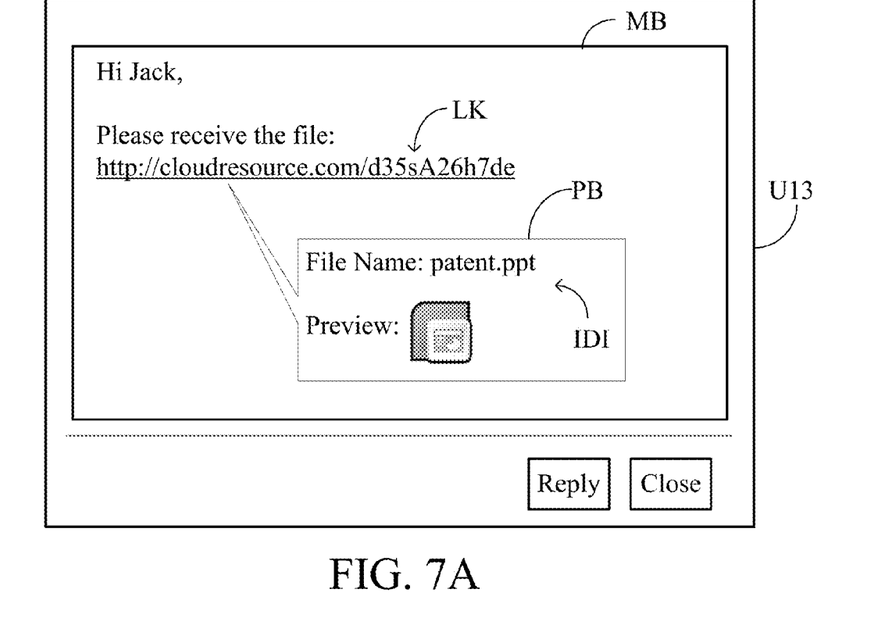
FIG. 7A and FIG. 7B depict a graphical user interface U13 of the user device 13 according to the second embodiment of the present invention.

A second embodiment of the present invention is shown in FIG. 6, which is a schematic view of a user device 13 of the present invention. The user device 131 comprises a network interface 131 and a processor 133. The network interface 131 is connected to the network 15 so as to connect to the cloud server 17 via the network 15. The processor 133 is electrically connected to the network interface 131. A user may, through operating the user device 13, enable the processor 133 to execute a communication program 133a and a plugin program 133b and to receive a communication message 104 by the communication program 133. After receiving the communication message 104, the communication program 133a will present the communication message 104 in a graphical user interface U13 of the communication program 133a, as shown in FIG. 7A. Similarly, the communication program 133a may be an E-mail program, an instant messaging program or any program capable of generating, editing, transmitting and receiving a message.

Likewise, the plugin program 133b is an auxiliary program, and is executed in the user device 13 in cooperation with the communication program 113a. The plugin program 133b is configured to detect whether a communication message 104 received by the communication program 133 includes the share link LK. Then, after the share link LK is detected, the plugin program 133b crawls the identity information IDI of the share link LK from the cloud server 17 according to the share link LK and presents the identity information IDI in the graphical user interface U13 of the communication program 133a.

Figure 7B:
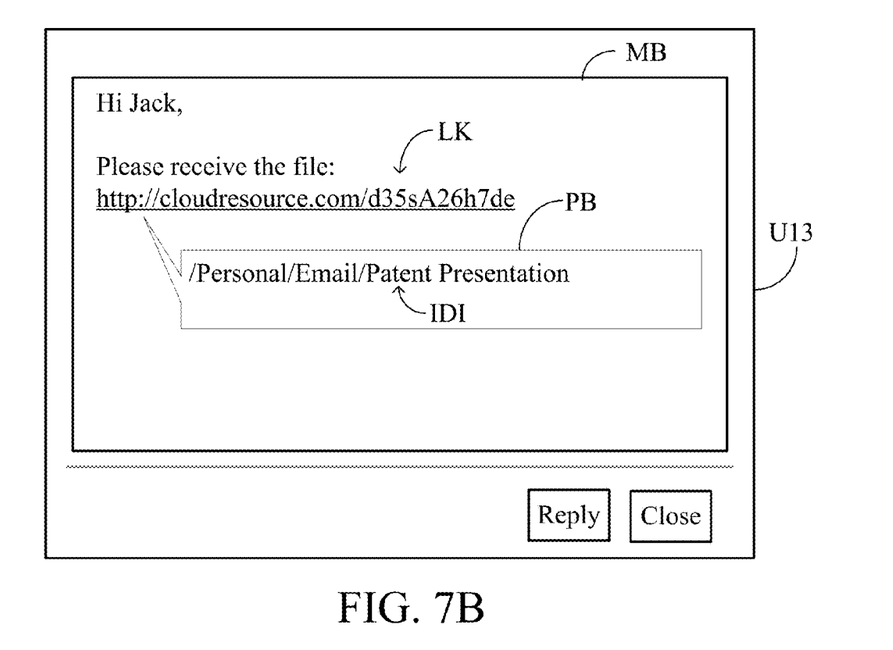

For example, as shown in FIG. 7A, when detecting that a mouse cursor or a long touch is located at a position of the share link LK in the graphical user interface U13, the plugin program 133b will present the identity information IDI in a popup display box PB of the graphical user interface U13. Then, when detecting that the mouse cursor or the touch is located not at the position of the share link LK in the graphical user interface U13, the plugin program 133b closes the popup display box PB. It should be appreciated that, in the example of FIG. 7A, the shared resource SR is a presentation file, and the identity information IDI includes the file name and a preview image of the presentation file. However, in other embodiments, the shared resource SR may be a folder path, and then the identity information IDI includes the path description, as shown in FIG. 7B.

Additionally, in other embodiments, when the communication message 104 generated by the communication program 133a includes an appended file, the plugin program 133b of the present invention may further upload the appended file to the cloud server 17 so that the cloud server 17 generates the share link LK and the identity information IDI according to the uploaded append file. Afterwards, the plugin program 133b adds the share link LK generated by the cloud server 17 into the communication message 104 automatically. In other words, the plugin program 133b presents the appended file of the communication message 104 in the form of the share link LK instead. Likewise, the identity information IDI may include the file name and a preview image or the path description. However, the information included in the identity information IDI is not intended to limit the present invention.

Figure 8:
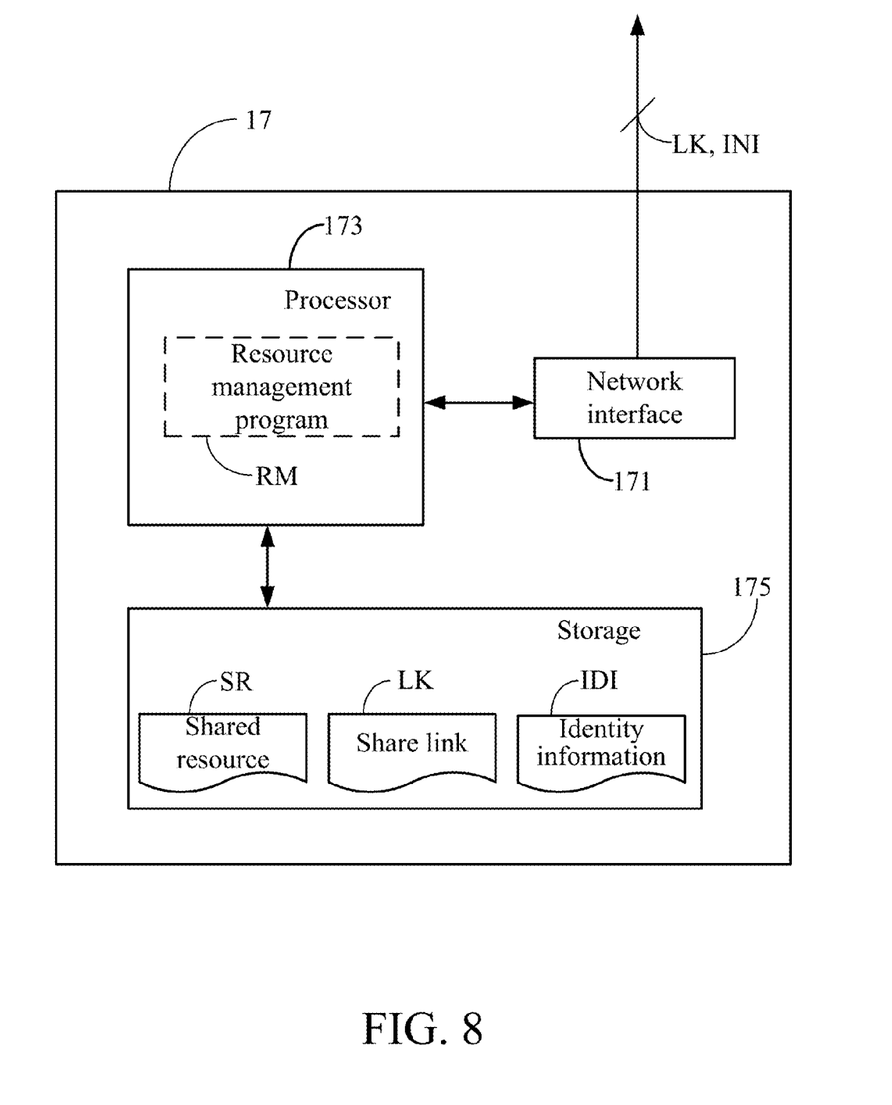
FIG. 8 is a schematic view of a cloud server 17 according to a third embodiment of the present invention.

A third embodiment of the present invention is shown in FIG. 8, which is a schematic view of the cloud server 17 of the present invention. The cloud server 17 comprises a network interface 171, a processor 173 and a storage 175. The network interface 171 is connected to the network 15. The processor 173 is electrically connected to the network interface 171 and the storage 175. The storage 175 stores the shared resource SR. The processor 173 executes a resource management program RM to generate the share link LK associated with the shared resource SR and the identity information IDI of the share link LK. After having generated the share link LK and the identity information IDI, the processor 173 further stores them into the storage 175.

As described previously, the user device 11 may be operated by the user to connect to the cloud server 17, and then the cloud server 17 may be operated to generate the share link LK and the identity information IDI thereof for the shared resource SR stored therein. In this case, the source management program RM generates the share link LK and the identity information IDI thereof in response to the user's operation. Thereby, when detecting that a communication message 102 in the communication program 113a includes the share link LK, the plugin program 113b of the user device 11 crawls the identity information IDI of the share link LK from the cloud server 17 according to the share link LK and presents the identity information IDI in the graphical user interface U11 of the communication program 113. Likewise, when detecting that a communication message 104 in the communication program 133a includes the share link LK, the plugin program 133b of the user device 13 may crawl the identity information IDI of the share link LK from the cloud server 17 according to the share link LK and present the identity information IDI in the graphical user interface U13 of the communication program 133a.

Additionally, in other embodiments, the resource management program RM may further be configured to encrypt the identity information IDI to provide security protection. In this case, the plugin program 113b of the user service 11 and the plugin program 133b of the user device 13 further decrypt the identity information IDI after crawling the identity information IDI. Because any of the conventional encryption and decryption technologies can be used in the present invention and the encryption and decryption technologies are not intended to limit the present invention, this will not be further described herein.

Figure 9:
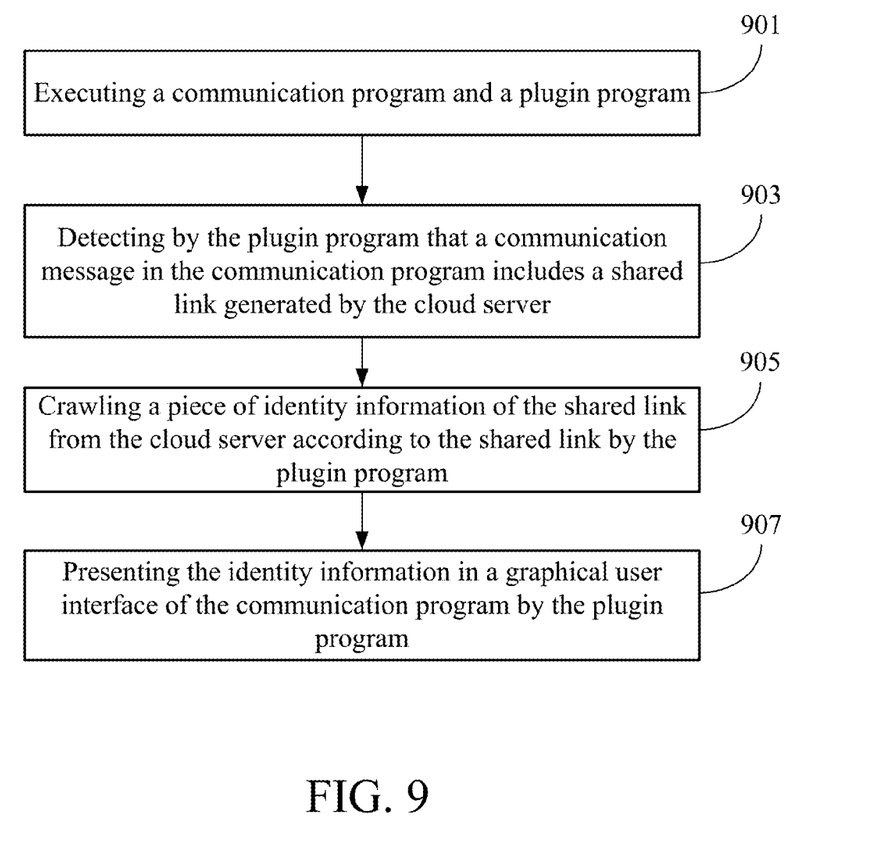
FIG. 9 is a flowchart diagram of a share link identification method according to a fourth embodiment of the present invention.

A fourth embodiment of the present invention is a share link identification method for a user device, a flowchart diagram of which is shown in FIG. 9. The share link identification method of this embodiment is applicable to all the user devices of the embodiments described above (e.g., the user device 11 and the user device 13). The user device comprises a network interface and a processor. The network interface is connected to a cloud server via a network. The processor is electrically connected to the network interface. The share link identification method of the present invention is executed by the processor.

Firstly, a communication program and a plugin program are executed in a step 901. Then in step 903, the plugin program detects that a communication message in the communication program includes a share link generated by a cloud server. This share link is associated with a shared resource stored in the cloud server. Next in a step 905, the plugin program crawls a piece of identity information of the share link from the cloud server according to the share link. Then in a step 907, the plugin program presents the identity information in a graphical user interface of the communication program.

For example, the plugin program may present the identity information in a popup display box of the graphical user interface in the step 907. Furthermore, in another example, the plugin program may present the identity information in a message content box of the graphical user interface in the step 907. In another embodiment, the plugin program may comprise a plugin primary program and an information crawling program. In this case, the step 903 is to detect that the communication message includes the share link by the plugin primary program; the step 905 is to crawl the identity information of the share link from the cloud server by the information crawling program; and the step 907 is to present the identity information in the graphical user interface by the plugin primary program.

In other embodiments, the share link identification method of the present invention further comprises a step of: embedding the identity information into the communication message by the plugin program. Thus, even if no corresponding plugin program is installed in the user device that receives the communication message, the identity information of the share link can also be obtained directly. Additionally in other embodiments, when the identity information IDI is encrypted by the cloud server, the share link identification method of the present invention further comprises a step of: decrypting the identity information by the plugin program.

In other embodiments, the share link identification method of the present invention further comprises the following steps of: generating a communication message by the communication program; and presenting the identity information in the graphical user interface of the communication program. Additionally in other embodiments, the share link identification method of the present invention further comprises the following steps of: receiving a communication message by the communication program; and presenting the identity information in the graphical user interface of the communication program.

In addition to the aforesaid steps, the share link identification method of this embodiment can also execute all the operations set forth in all the aforesaid embodiments and have all the corresponding functions. How this embodiment executes these operations and have these functions will be readily appreciated by those of ordinary skill in the art based on the explanation of all the aforesaid embodiments, and thus will not be further described herein.

Figure 10:
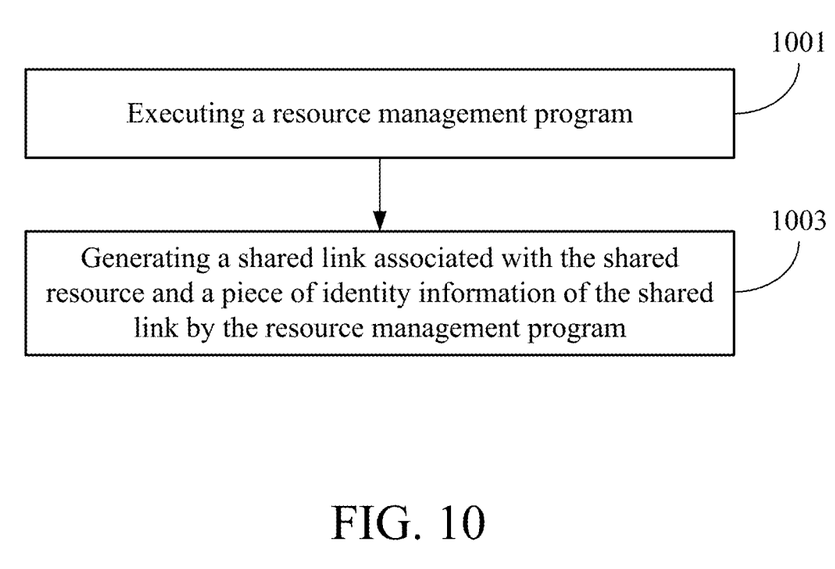
FIG. 10 is a flowchart diagram of the share link identification method according to the fourth embodiment of the present invention.

A fifth embodiment of the present invention is a share link identification method for a cloud server, a flowchart diagram of which is shown in FIG. 10. The share link identification method of this embodiment is applicable to all the cloud servers of embodiments described above (e.g., the cloud server 17). The cloud server comprises a storage, a network interface and a processor. The storage stores a shared resource. The network server is connected to a network. The processor is electrically connected to the storage and the network interface. The share link identification method of the present invention is executed by the processor. Firstly, a resource management program is executed in a step 1001. Then, a share link associated with the shared resource and a piece of identity information of the share link are generated by the resource management program in a step 1003. Thus, when a communication message in a communication program running in a user device includes the share link, a plugin program running in the user device can crawl the identity information of the share link from the cloud server according to the share link and present the identity information in a graphical user interface of the communication program.

In other embodiments, the share link identification method of the present invention further comprises a step of: encrypting the identity information by the resource management program. In this case, the plugin program running in the user device further decrypts the identity information after crawling the identity information.

In addition to the aforesaid steps, the share link identification method of this embodiment can also execute all the operations set forth in all the aforesaid embodiments and have all the corresponding functions. How this embodiment executes these operations and have these functions will be readily appreciated by those of ordinary skill in the art based on the explanation of all the aforesaid embodiments, and thus will not be further described herein.

According to the above descriptions, a piece of identity information can also be generated by the cloud server of the present invention when generating a share link. In this case, by executing a plugin program, the user device of the present invention can detect a share link included in a communication message so as to crawl a piece of identity information of the share link from the cloud server and then present the identity information. Thereby, the user can simply and directly identify the shared resources corresponding to the share link according to the presented identity information without having to access the shared resources corresponding to the share link.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A user device, comprising:
    a network interface, being connected to a cloud server via a network; and
    a processor, being electrically connected to the network interface and configured to execute a communication program and a plugin program;
    wherein the plugin program is configured to detect that a communication message in the communication program includes a share link generated by the cloud server and associated with a shared resource stored in the cloud server, and the plugin program is further configured to crawl a piece of identity information of the share link from the cloud server according to the share link and present the identity information in a graphical user interface of the communication program for identifying the shared resource, wherein the identity information represents the shared resource and is separated from the share link.

2. The user device of claim 1, wherein the plugin program presents the identity information in a popup display box of the graphical user interface.

3. The user device of claim 1, wherein the plugin program presents the identity information in a message content box of the graphical user interface.

4. The user device of claim 1, wherein the plugin program is further configured to embed the identity information into the communication message.

5. The user device of claim 1, wherein the plugin program is further configured to decrypt the identity information.

6. The user device of claim 1, wherein the plugin program comprises a plugin primary program and an information crawling program, the plugin primary program is configured to detect that the communication message includes the share link, the information crawling program is configured to crawl the identity information of the share link from the cloud server, and the plugin primary program is further configured to present the identity information in the graphical user interface.

7. The user device of claim 1, wherein the communication program is further configured to generate the communication message and to present the communication message in the graphical user interface of the communication program.

8. The user device of claim 1, wherein the communication program is further configured to receive the communication message and present the communication message in the graphical user interface of the communication program.

9. A share link identification method for a user device, the user device comprising a network interface and a processor, the network interface being connected to a cloud server via a network, and the share link identification method being executed by the processor and comprising:
    (a) executing a communication program and a plugin program;
    (b) detecting by the plugin program that a communication message in the communication program includes a share link generated by the cloud server, wherein the share link is associated with a shared resource stored in the cloud server;
    (c) crawling, by the plugin program, a piece of identity information of the share link from the cloud server according to the share link; and
    (d) presenting, by the plugin program, the identity information in a graphical user interface of the communication program for identifying the shared resource, wherein the identity information represents the shared resource and is separated from the share link.

10. The share link identification method of claim 9, wherein the step (d) is to present the identity information in a popup display box of the graphical user interface by the plugin program.

11. The share link identification method of claim 9, wherein the step (d) is to present the identity information in a message content box of the graphical user interface by the plugin program.

12. The share link identification method of claim 9, further comprising embedding the identity information into the communication message by the plugin program.

13. The share link identification method of claim 9, further comprising decrypting the identity information by the plugin program.

14. The share link identification method of claim 9, wherein the plugin program comprises a plugin primary program and an information crawling program, and wherein the step (b) is to detect by the plugin primary program that the communication message includes the share link, the step (c) is to crawl the identity information of the share link from the cloud server by the information crawling program, and the step (d) is to present the identity information in the graphical user interface by the plugin primary program.

15. The share link identification method of claim 9, further comprising:
    generating the communication message by the communication program; and
    presenting the communication message in the graphical user interface of the communication program by the communication program.

16. The share link identification method of claim 9, further comprising:
    receiving the communication message by the communication program; and
    presenting the communication message in the graphical user interface of the communication program by the communication program.

17. A cloud server, comprising:
    a storage, being configured to store a shared resource;
    a network interface connected to a network; and
    a processor electrically connected to the storage and the network interface, being configured to execute a resource management program to generate a share link associated with the shared resource and a piece of identity information of the share link;
    wherein when a communication message in a communication program running in a user device includes the share link, and a plugin program running in the user device crawls the identity information of the share link from the cloud server according to the share link and presents the identity information in a graphical user interface of the communication program for identifying the shared resource, wherein the identity information represents the shared resource and is separated from the share link.

18. The cloud server of claim 17, wherein the resource management program is further configured to encrypt the identity information, and the plugin program running in the user device is further configured to decrypt the identity information after crawling the identity information.

19. A share link identification method for a cloud server, the cloud server comprising a storage, a network interface and a processor, the storage being configured to store a shared resource, the network interface being connected to a network, and the share link identification method being executed by the processor and comprising:

executing a resource management program; and
 generating a share link associated with the shared resource and a piece of identity information of the share link by the resource management program;

wherein when a communication message in a communication program running in a user device includes the share link, and a plugin program running in the user device crawls the identity information of the share link from the cloud server according to the share link and presents the identity information in a graphical user interface of the communication program for identifying the shared resource, wherein the identity information represents the shared resource and is separated from the share link.

20. The share link identification method of claim 19, further comprising:

encrypting the identity information by the resource management program;
 wherein the plugin program running in the user device further decrypts the identity information after crawling the identity information.

\* \* \* \* \*